Oct. 30, 1962  G. RINSOZ  3,060,765
DIFFERENTIAL GEAR
Filed April 7, 1960
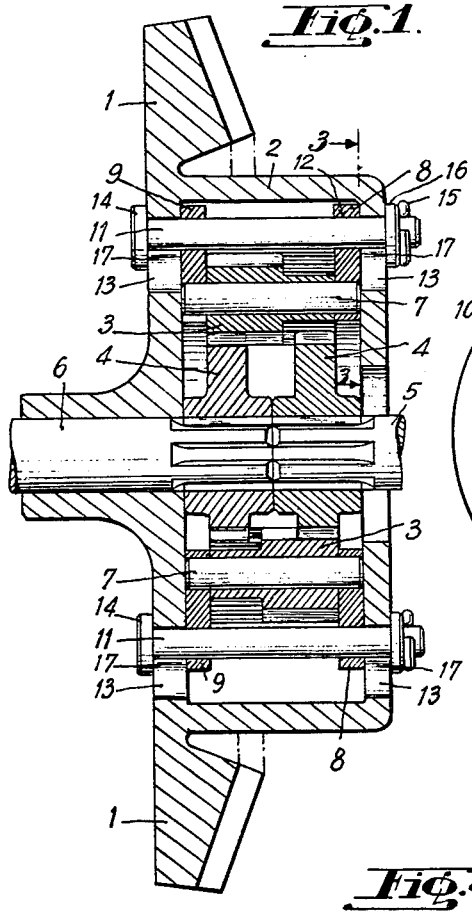
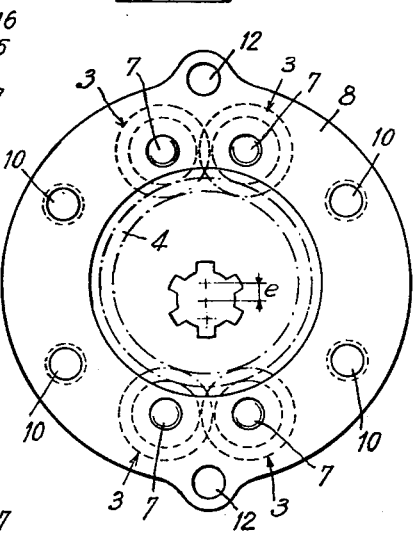
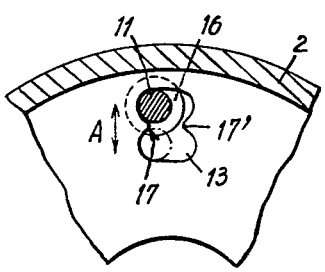
INVENTOR
GILBERT RINSOZ

United States Patent Office 3,060,765
Patented Oct. 30, 1962

3,060,765
DIFFERENTIAL GEAR
Gilbert Rinsoz, 32 Rue des Deux-Ponts,
Geneva, Switzerland
Filed Apr. 7, 1960, Ser. No. 20,603
Claims priority, application Switzerland Apr. 14, 1959
4 Claims. (Cl. 74—710.5)

My invention has for its object a differential gear including a toothed driving crown wheel rigid with the casing inside which are housed two planet pinions meshing with sunwheels keyed to the ends of two alined driven shaft elements.

According to my invention, the differential gear includes a carrier for the planet pinions, which carrier is movably fitted inside the casing, while each sunwheel is keyed eccentrically to the corresponding shaft element, so that, when the differential gear is operative with the sunwheels moving with reference to each other, the carrier for the planet wheels assumes a reciprocatory movement inside the casing, while means are provided for the automatic locking of said planet pinion carrier with reference to the casing rigid with the driving crown wheel, so as to rigidly interconnect the driving crown wheel with both shaft elements under normal operative conditions.

The accompanying drawing illustrates, by way of example, a preferred embodiment of a differential gear according to my invention. In said drawing:

FIG. 1 is an axial sectional view of the differential gear.

FIG. 2 is a front elevational view of a plate forming part of the planet pinion carrier.

FIG. 3 is a detail sectional view through line 3—3 of FIG. 1.

The differential gear illustrated includes a toothed driving crown wheel 1 rigid with a casing 2 housing the planet pinions 3 meshing with the sunwheels 4 keyed to the cooperating ends of the alined driven shaft elements 5 and 6. The differential gear is assumed to be incorporated with a vehicle adapted to run on rough ground, chiefly with an agricultural tractor, the driving wheels of which are keyed to the shaft elements 5 and 6.

The planet pinions 3 are keyed to spindles 7 which are revolvably carried by a carrier formed by two annular plates 8 and 9 rigidly secured together through the agency of four pins or like fastenings 10 arranged symmetrically round the axis of said annular plates 8 and 9, as illustrated in FIG. 2. Carrier support bolts 11 pass furthermore through diametrically opposed openings 12 formed in said annular plates 8 and 9, the shanks of said locking bolts 11 being shiftably mounted in openings 13 (FIG. 3) formed in the sidewalls of the casing 2. The locking bolts 11 are each held inside the casing by means of a terminal head 14 at one end, while its other end is held by a pin 15 extending over a securing washer 16.

Each sunwheel 4 is fitted eccentrically over the corresponding shaft elements 5 or 6. The eccentricity e of the wheels 4 produces, when the differential gear operates as such, a shifting by an amount 2e of the carrier 8—9 of the planet pinions 3 inside the casing 2. The radial length of the openings 13 must therefore be such that it allows such a shifting of the locking bolts 11, as described hereinafter.

The openings 13 are provided laterally, as shown in FIG. 3, with inwardly projecting teeth 17 and 17' adapted to hold the corresponding bolt 11 in its lateral locking position.

The operation of the differential gear described is as follows:

When the tractor progresses along a straight line, the differential gear is locked and the two shaft elements 5 and 6 are positively coupled with the casing 2 and, consequently, with the toothed crown wheel 1. Said locking is obtained because the bolts 11 are urged, by the driving torque exerted on the toothed crown wheel 1, into engagement with the teeth 17 in the openings 13, which prevents any reciprocation of the plates 8 and 9 forming the carrier of the planet pinions, in the direction illustrated by the arrow A in FIG. 3. Thus, the shaft elements revolve in unison with the casing.

When the tractor turns, for instance at the end of a field, the shaft element on the inner side of the turn is practically held fast, while the shaft element on the outer side drives its wheel and this produces automatically the release of the locking bolts 11 with reference to the teeth 17. The differential gear is thus operative and the casing 2, carrying along with it the carrier plates of the planet pinions, imparts to the latter in combination a reciprocation and a rotation round the sunwheel 4 which is rigid with the shaft element carried by the transiently stationary wheel on the inside of the tractor, while the other sunwheel is driven into rotation with the shaft element carrying the wheel on the off side.

As soon as the two tractor wheels are subjected again to the same torque, the locking stays 11 are again automatically locked in the corresponding recesses of the openings 13 defined by the teeth, as described. The teeth 17' facing the teeth 17 in the different openings 13 are provided with a view to obtaining the same automatic operation of the differential gear when the tractor moves rearwardly, i.e. when the toothed crown wheel 1 is driven in a direction opposed to that which has just been described.

Obviously, the openings 13 may be provided each only with one tooth if the locking of the differential gear is to be obtained only for forward progression of the tractor.

On the other hand, instead of four openings 13 arranged in diametrically opposed pairs, it is possible to provide same only in one of the sidewalls of the casing 2. The planet pinion carrier may also, if desired, be provided with a single locking bolt 11 cooperating with a single opening 13.

The differential gear described may, obviously, be incorporated with vehicles other than agricultural tractors and, in particular, with automobiles.

I claim:

1. A differential gear comprising a hollow casing having opposite side walls each provided with a pair of diametrically aligned openings which register with openings of the other wall, a driving crown wheel rigid with the periphery of one of the side walls of said casing, two aligned shaft elements extending axially through related openings of different size in the side walls into the casing and the ends of which elements face each other inside said casing, equal sun wheels carried inside the casing and keyed with equal eccentricities to the inner ends of the corresponding shaft elements, a carrier mounted inside said casing and adapted to be shifted in a plane perpendicular to its axis, two pairs of planet pinions rotatably mounted on said carrier, the planet pinions of each pair meshing together, one planet pinion of each pair meshing with one of the sun wheels and the other planet pinion of said pair meshing with the other of said sun wheels, and bolts for mounting said carrier in the casing against relative angular movement with respect to the carrier and providing operating engagement between the crown wheel on the casing, said bolts having their opposite ends mounted in said aligned openings in the side walls of the casing, whereby upon braking of one of said shaft elements the bolts may shift from one end of said openings to the other end.

2. A differential gear according to claim 1 wherein the aligned openings are elongated and at least one tooth extends inwardly from a side of the opening to provide two recesses, whereby, when a related bolt is urged against said tooth by the torque transmitted equally to said shaft elements from the crown wheel, said bolts will shift from one recess to the other.

3. A differential gear, comprising, a casing including at least one radial wall provided with two diametrically opposed openings whose outlines define two recesses with at least one tooth extending therebetween perpendicularly to the radius passing through the opening, a driving crown wheel rigid with said casing, two aligned shaft elements extending axially into the casing and the ends of said shafts facing each other inside said casing, equal sunwheels carried inside the casing and keyed eccentrically with equal eccentricities to the inner ends of the corresponding shaft elements, a carrier in said casing, two pairs of planet pinions rotatably mounted on said carrier, the planet pinions of each pair meshing together, one planet pinion of each pair meshing with one of said sunwheels and the other planet pinion of said pair meshing with the other of said sunwheels, bolts rigid with the carrier and having their ends engaging the openings in the casing wall to be shifted in a plane perpendicular to the axes of the casing, said bolts adapted to be locked by the teeth in the openings whenever said bolts are urged against said teeth by the torque transmitted equally to the shaft elements from the toothed crown wheel for a predetermined direction of rotation of the latter.

4. A differential gear including a casing comprising at least one radial wall provided with at least one opening, the profile of which includes two recesses with two teeth facing each other and extending therebetween perpendicularly to the radius passing through the opening, a crown wheel rigid with said casing, two aligned shaft elements extending axially into the casing and the ends of which face each other inside said casing, equal sunwheels carried inside the casing and keyed eccentrically with equal eccentricities to the inner ends of the corresponding shaft elements, a carrier mounted inside said casing, two pairs of planet pinions rotatably mounted on said carrier, the planet pinions of each pair meshing together, one planet pinion of each pair meshing with one of said sunwheels and the other planet pinion of said pair meshing with the other of said sunwheels, bolts for mounting the carrier in the casing, said bolts engaging the openings and adapted to be urged against said teeth by the torque transmitted equally to the shaft elements from the toothed crown wheel for corresponding directions of rotation of the latter.

References Cited in the file of this patent
UNITED STATES PATENTS

| | | |
|---|---|---|
| 895,661 | Morrison | Aug. 11, 1908 |
| 900,857 | Jeffery | Oct. 13, 1908 |